United States Patent
Yachamaneni et al.

(10) Patent No.: US 12,497,165 B2
(45) Date of Patent: Dec. 16, 2025

(54) ROTARY ACTUATOR

(71) Applicant: EATON INTELLIGENT POWER LIMITED, Dublin (IE)

(72) Inventors: Madhu Yachamaneni, Andhra Pradesh (IN); Yogesh Jayant Kulkarni, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 18/768,583

(22) Filed: Jul. 10, 2024

(65) Prior Publication Data
US 2025/0019069 A1 Jan. 16, 2025

(30) Foreign Application Priority Data
Jul. 13, 2023 (IN) .............................. 202311047129

(51) Int. Cl.
*F16D 41/12* (2006.01)
*B64C 25/44* (2006.01)
*F16D 65/16* (2006.01)
*F16D 67/06* (2006.01)
(Continued)

(52) U.S. Cl.
CPC ............ *B64C 25/44* (2013.01); *F16D 41/125* (2013.01); *F16D 65/16* (2013.01); *F16D 67/06* (2013.01); *F16D 2121/20* (2013.01); *F16D 2125/48* (2013.01)

(58) Field of Classification Search
CPC .. F16D 67/02–06; F16D 41/00; F16D 41/125; H02K 7/1125; H02K 7/116; H02K 7/07; H02K 7/10; H02K 7/1085; H02K 7/1023; F16H 49/001–2049/008
See application file for complete search history.

(56) References Cited

U.S. PATENT DOCUMENTS

| | | | |
|---|---|---|---|
| 3,412,625 A | 11/1968 | Sidney et al. | |
| 4,398,110 A * | 8/1983 | Flinchbaugh | F16D 65/18 623/24 |

(Continued)

FOREIGN PATENT DOCUMENTS

| CN | 111585382 A | 2/2019 |
|---|---|---|
| CN | 215871065 U | 8/2021 |

(Continued)

OTHER PUBLICATIONS

European Search Report dated Nov. 12, 2024 for EP24188056.6, 14 pages.

*Primary Examiner* — Ernesto A Suarez
*Assistant Examiner* — Lillian T Nguyen
(74) *Attorney, Agent, or Firm* — Merchant & Gould P.C.

(57) ABSTRACT

A rotary actuator includes a motor powering a harmonic drive during normal operation. The rotary actuator includes a brake that can selectively hold the position of the harmonic drive even in the event of main power loss to the rotary actuator. The rotary actuator includes a clutch arrangement that allows freewheeling of the harmonic drive in only a first rotational direction in the event of power loss to the rotary actuator. The clutch arrangement also enables movement in the second rotational direction without transferring to the motor when the counter-load on the harmonic actuator exceeds a predetermined amount of force.

19 Claims, 3 Drawing Sheets

(51) Int. Cl.
    *F16D 121/20*      (2012.01)
    *F16D 125/48*      (2012.01)

(56)            References Cited

U.S. PATENT DOCUMENTS 7,985,156  B2 *   7/2011   Han ..................... F16H 33/185
                                                            475/255
    8,752,790  B2     6/2014   Humphrey
    9,322,395  B2     4/2016   Fujiwara et al.
 2019/0341825  A1 *  11/2019   Gildner ................. H02K 7/085
 2023/0216391  A1     7/2023   Socheleau et al.
 2024/0101219  A1 *   3/2024   Ackermann ........... H02K 21/22

FOREIGN PATENT DOCUMENTS

EP          3348362          7/2018
    JP          6040865  A       8/1983
    JP          2007239694       9/2007
    WO          2017005184  A1   7/2015

* cited by examiner

ROTARY ACTUATOR

CROSS-REFERENCE TO RELATED APPLICATION

This application claims the benefit of Indian Provisional Patent Application No. 202311047129 filed on Jul. 13, 2023, entitled "ROTARY ACTUATOR" which is hereby incorporated by reference in their entirety for all that is taught and disclosed therein.

BACKGROUND

More-electric aircraft and all-electric aircraft are increasingly becoming more relevant in the aerospace industry. Although actuators in aircraft control mechanisms have conventionally been hydraulic/mechanical systems, electrical drive systems (EDS) including an electric motor and an electric drive are gaining interest in aerospace applications due to growing demands for more/all-electric aircrafts. In some implementations, a flight control actuation system using electric motors and drives can be used to move the aircraft flight control surfaces to respective commanded positions.

The maneuverability of an aircraft depends heavily on the movement flight control surfaces. Typical flight control surfaces include ailerons, flaps, slats, and spoilers. By selectively extending and retracting the flight control surfaces, the aerodynamic flow conditions of the wings may be influenced so as to increase or decrease the lift generated by the wings. For example, during the take-off and landing phases of a flight, the position of the flight control surfaces of the aircraft are adjusted to optimize the lift and drag characteristics of the wing. It can be appreciated the reliable operation of the flight control surfaces is of importance to an aircraft.

In some implementations, an external brake assembly is provided to lock the position of the motor, such as a solenoid-type brake attached to the motor shaft. Motor applications with external braking systems exist in other industries as well. Improvements are desired.

SUMMARY

Some aspects of the disclosure are directed to a rotary actuator and methods of use thereof. The rotary actuator includes a motor powering a harmonic drive during normal operation.

In certain implementations, the rotary actuator includes a clutch arrangement that allows freewheeling of the harmonic drive in only a first rotational direction in the event of power loss to the rotary actuator.

In certain examples, in the event of power loss, the clutch arrangement disconnects the harmonic drive from the motor and instead connects the harmonic drive to a one-way clutch.

In certain implementations, the clutch arrangement also enables movement of the harmonic drive in the second rotational direction without transferring strain to the motor when a counter-load on the harmonic actuator exceeds a predetermined amount of force.

In certain examples, the clutch arrangement includes a slip clutch that allows slippage between the harmonic drive and the motor upon the application of a predetermined amount of counterforce at the harmonic drive output. In certain examples, the slip clutch also allows slippage between the harmonic drive and the one-way clutch.

In certain implementations, the rotary actuator includes a brake that can selectively hold the position of the harmonic drive without straining the motor. In certain examples, the brake can hold the position even in the event of main power loss to the rotary actuator.

In certain examples, a portion of the clutch arrangement can be separately powered (e.g., by a battery back up) to continue to connect the motor (and brake) to the harmonic drive in the event of power loss.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
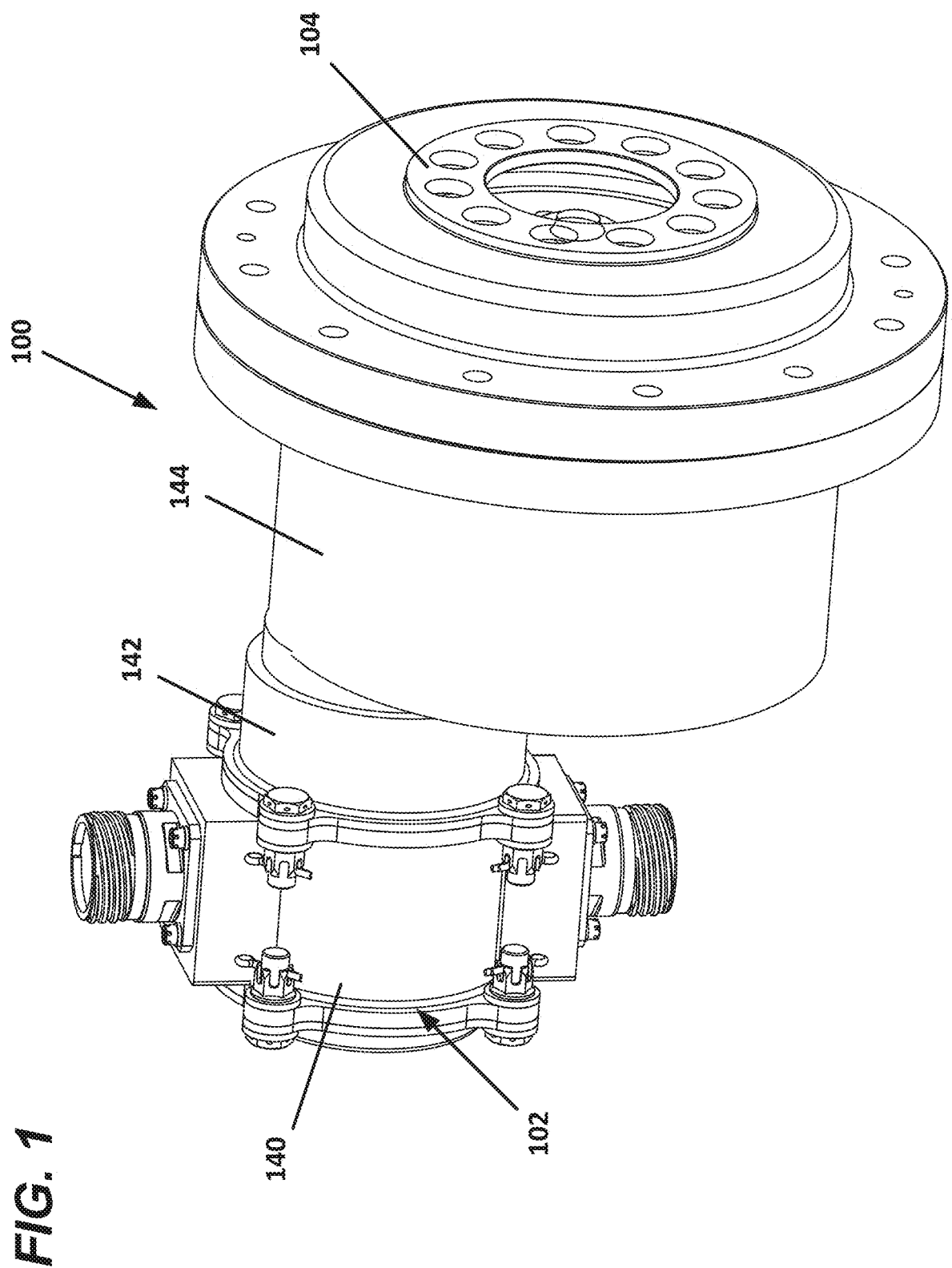
FIG. 1 is a perspective view of an example rotary actuator.

FIG. 1 illustrates a rotary actuator 100 including a motor and a harmonic drive 104. The rotary actuator 100 is configured to transition between an operating mode and an unpowered mode. The motor 102 drives (e.g., supplies torque to) the harmonic drive 104 when the rotary actuator 100 is configured in the operating mode. The harmonic drive 104 is disconnected from the motor 102 when the rotary actuator 100 is configured in the unpowered mode.

In certain implementations, the harmonic drive 104 is allowed to freewheel independent of the motor 102 in a first rotational direction and is inhibited from freewheeling in a second rotational direction when the rotary actuator 100 is configured in the unpowered mode. In certain implementations, the harmonic drive 104 is allowed to rotate in the second rotational direction upon the application of a predetermined amount of torque from an exterior of the rotary actuator 100 when the rotary actuator 100 is configured in the unpowered mode.

In certain implementations, the rotary actuator 100 also is configured to transition to a hold position mode. The harmonic drive 104 is held stationary when the rotary actuator 100 is configured in the hold position mode.

Figure 2:
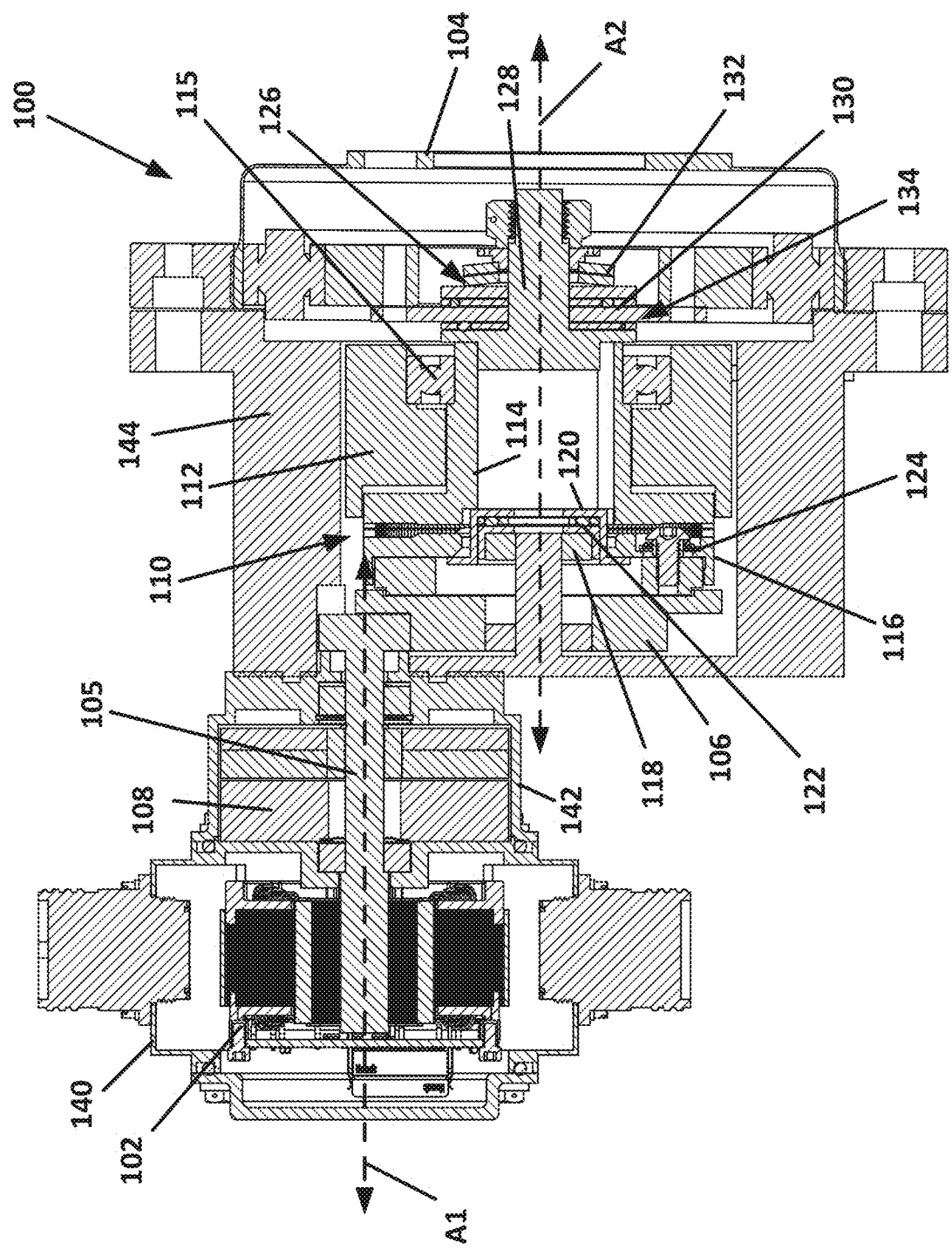
FIG. 2 is an axial cross-sectional view of the rotary actuator of FIG. 1.

As shown in FIG. 2, the harmonic drive 104 is coupled to the motor 102 using a motor pinion 105, a gear arrangement 106, and a first clutch 110. The first clutch 110 transitions between an actuated state and a de-actuated state. When in the actuated state, the first clutch 110 transfers torque between the gear arrangement 106 and the harmonic drive 104. When in the de-actuated state, the first clutch 110 does not transfer torque between the gear arrangement 106 and the harmonic drive 104. When in the de-actuated state, the first clutch 110 disconnects the harmonic drive 104 from the gear arrangement 106 and instead connects the harmonic drive 104 to a second clutch 118. The second clutch 118 allows movement in a first rotational direction and inhibits movement in the opposite, second rotational direction.

Accordingly, when the rotary actuator 100 is configured in the operating mode, the first clutch 110 is configured in the actuated state to enable the motor 102 to drive the harmonic drive 104 through the gear 106. The first clutch 110 also is actuated when the rotary actuator 100 is configured in the hold position mode as will be discussed in more detail herein. When the rotary actuator 100 is configured in the unpowered mode (e.g., when main power to the rotary actuator 100 is lost), the first clutch 110 is configured in the de-actuated mode. Accordingly, the second clutch 118 enables the harmonic drive 104 to free-wheel in the first rotational direction, but not in the second rotational direction.

In certain implementations, the first clutch 110 is an electro-magnetic clutch including a stator 112, a rotor 114, and an armature 116. The stator 112 holds a selectively energizable electro-magnet coil. The rotor 114 is rotatable relative to the stator 112 (e.g., using a bearing arrangement 115). The armature 116, which includes a ferrous metal, is axially movable relative to the rotor 114 and stator 112 between actuated and non-actuated positions under the influence of the electro-magnet coil. When the coil is energized, the coil pulls the armature 116 to the actuated position. When the coil is de-energized, the armature 116 is biased (e.g., by a spring 124) to the non-actuated position.

The armature 116 is meshed or keyed with the gear arrangement 106 regardless of its position. The armature 116 is configured to mesh or key with the rotor 114 when disposed in the actuated position, thereby transferring torque between the gear arrangement 106 and the rotor 114. Accordingly, the rotor 114 rotates in unison with the armature 116 and gear arrangement 106 when the armature 116 is disposed in the actuated position. The armature 116 disconnects from (e.g., is spaced from) the rotor 114 when disposed in the non-actuated position. Accordingly, any torque applied to the harmonic drive 104 is not transferred back to the motor 102 through the gear arrangement 106.

In certain implementations, a sleeve 120 is disposed at the second clutch 118. The sleeve 120 is keyed or otherwise mechanically connected to the rotor 114 of the first clutch 110 to move in unison. The sleeve 120 is axially movable relative to the second clutch 118 between a non-engaged position and an engaged position. A friction plate 122 is disposed between the sleeve 120 and the second clutch 118. When in the non-engaged position, the sleeve 120 rotates relative to the second clutch 118 and friction plate 122. When in the engaged position, the sleeve 120 is axially pressed against the friction plate 122 to connect the sleeve 120 to the second clutch 118. Accordingly, the rotor 114 of the first clutch 110 is connected to the second clutch 118 via the sleeve 120 and friction plate 122. In certain implementations, the second clutch 118 is a Sprag clutch. Other configurations are possible.

Figure 3:
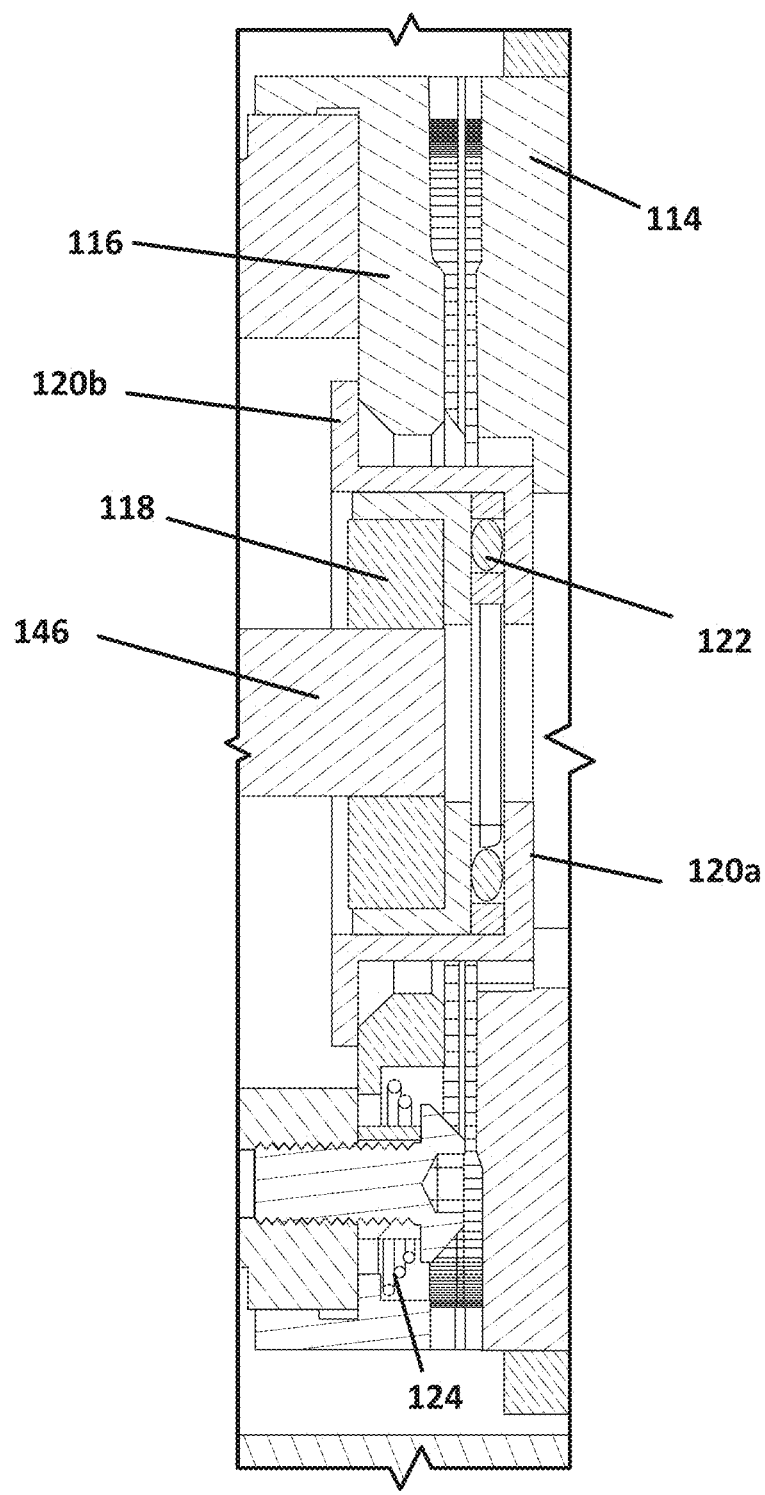
FIG. 3 is an enlarged view of a portion of FIG. 2.

When the rotary actuator 100 loses main power, the electro-magnet coil is deenergized (e.g., absent a battery back-up) and transitions to the de-actuated state. Accordingly, the armature 116 is biased to the non-actuated position. In certain implementations, the armature 116 presses against the sleeve 120 to bias the sleeve 120 against the friction plate 122 when the armature 116 is biased to the non-actuated position. For example, the sleeve 120 may include a main pocket in which the second clutch 118 and friction plate 122 seat and an outer rim 120b against which the armature 116 presses (e.g., see FIG. 3). A main surface 120a partially defines the main pocket.

In certain implementations, a third clutch 126 is disposed between the first clutch 110 and the harmonic drive 104 (e.g., see FIG. 2). The third clutch 126 is a slip clutch that allows slipping between the harmonic drive 104 and the first clutch 110 (e.g., the rotor 114 of the first clutch 110) upon the application of a predetermined amount of torque at the harmonic drive 104. Accordingly, the third clutch 126 protects against an excessive load in either rotational direction being transferred back to the motor 102 when the first clutch 110 is actuated during normal operation or the hold position mode. Further, the third clutch 126 enables movement of the harmonic drive 104 in the second rotational direction upon the application of the predetermined amount of toque in the event of power loss to the rotary actuator 100. As noted above, the harmonic drive 104 may freewheel in the first rotational direction in the event of power loss.

In certain implementations, the third clutch 126 includes a body 128, one or more friction plates 130 (e.g., skewed roller plates), and a biasing arrangement 132. The body 128 of third clutch 126 is meshed, keyed, or otherwise coupled to the rotor 114 of the first clutch 110 for rotation therewith. The one or more friction plates 130 are disposed between the body 128 and an adapter 134 (e.g., a transfer plate) for the harmonic drive 104. The biasing arrangement 132 applies a biasing force (e.g., a thrust force) to the friction plate(s) 130 to couple the body 128 to the adapter 134 for rotation therewith. In certain implementations, the biasing arrangement 132 includes a spring arrangement (e.g., Belleville springs or disc springs). When the torque applied to the harmonic drive 104 and through the adapter 134 overcomes the biasing force of the biasing arrangement 132, the adapter 134 can move (e.g., slip) relative to the body 128.

In certain implementations, the biasing force of the biasing arrangement 132 is set above the expected amount of counterforce to be applied to the harmonic drive 104 during normal operation. For example, if the rotary actuator 100 is controlling an aircraft flap, an aircraft spoiler, or another secondary control surface, the biasing force of the biasing arrangement 132 would be set higher than the amount of aerodynamic load expected to be applied to the secondary control surface during a flight.

In certain implementations, a brake 108 is disposed along the motor pinion 105 between the motor 102 and the gear arrangement 106. When the brake 108 is disengaged, the brake 108 allows the motor pinion 105 to rotate under the power of the motor 102. When the brake 108 is engaged, the brake 108 stops the motor pinion 105 from rotating. In certain implementations, the brake 108 is an electro-magnetic brake. In certain implementations, the brake 108 is disengaged during the normal operating mode of the rotary actuator 100. In certain implementations, the brake 108 is engaged during the unpowered mode.

In certain implementations, the brake 108 is engaged during the hold position mode. When engaged, the brake 108 holds the motor pinion 105 against movement without straining the motor 102. The brake 108 also can hold the motor pinion 105 against movement when the motor 102 is powered off. In certain examples, if the brake 108 is an electro-magnetic brake, then the brake 108 is disengaged when powered and automatically engages when unpowered (e.g., if the rotary actuator 100 loses power).

By holding the motor pinion 105 against movement, the brake 108 is holding the gear arrangement 106 against movement. If the first clutch 110 is actuated, the brake 108 is also holding the harmonic drive 104 against movement. In certain implementations, the first clutch 110 can be electrically coupled to a back-up battery so that the first clutch 110 can be maintained in its actuated state even in the event of a power loss if the position of the harmonic drive output is desired to be maintained. As discussed above, this hold can be overcome at the third clutch 126 by the application of a predetermined amount of force in either rotational direction.

In certain implementations, the brake 108, the motor 102, and the motor pinion 105 are aligned along a first rotational axis A1. In certain implementations, the gear arrangement 106 and the rotor 114 of the first clutch 110 are aligned along a second rotational axis A2. For example, the gear arrangement 106 may be a spur gear. In certain examples, the second rotational axis A2 is parallel to the first rotational axis A1. In certain examples, the second clutch 118 is aligned along the second rotational axis A2. In certain examples, the third clutch 126 and adapter 134 are aligned along the second rotational axis A2. In certain examples, the biasing arrangement 132 of the slip clutch 126 applies the biasing force to the friction plate(s) 130 along the second axis A2.

In certain implementations, the motor 102 is disposed within a motor housing 140. In some implementations, the brake 108 is disposed within a brake housing 142 that couples to the motor housing 140. In other implementations, the brake 108 also may be mounted within the motor housing 140. In certain implementations, the gear arrangement 106 is disposed within a gear housing 144. The harmonic drive 104 is coupled to the gear housing 144. In some examples, the first clutch 110 also is disposed within the gear housing 144. In other examples, the first clutch 110 may be disposed within a separate clutch housing. In certain implementations, the second clutch 118 is disposed in a common housing (e.g., the gear housing 144) as the first clutch 110. In certain implementations, the gear housing 144 includes an inward protrusion 146 about which the second clutch 118 is mounted (e.g., see FIG. 3).

In use, main power (e.g., main aircraft power) is supplied to the rotary actuator 100 during normal operation of the flight. The first clutch 110 is actuated and the brake 108 is disengaged. Accordingly, the motor 102 drives the gear arrangement 106 through the motor pinion 105 and the torque from the gear arrangement 106 is transferred through the first clutch 110 to the harmonic drive 104.

A slip clutch 126 inhibits a backload exceeding a predetermined amount of torque from transferring through the rotary actuator 100 to the first clutch 110. Accordingly, the slip clutch 126 allows movement relative to the first clutch 110 (e.g., to the rotor 114 of the first clutch 110) in either rotational direction.

If main power is lost to the rotary actuator 100, the brake 108 automatically engages the motor pinion 105. Accordingly, the gear arrangement 106 is held stationary. If the position of the harmonic drive 104 should be maintained (e.g., if the position of a secondary flight control surface operated by the rotary actuator 100 should be maintained), then the first clutch 110 may remain actuated (or be re-actuated) using a battery back-up. Accordingly, the harmonic drive 104 will be connected to the gear arrangement 106 and thus held stationary.

If the harmonic drive 104 should be allowed to freewheel, however, then power is ceased to the first clutch 110. The first clutch 110 transitions to the de-actuated state and disconnects the harmonic drive 104 from the gear arrangement 106. In particular, the armature 116 of the first clutch 110 disengages the rotor 114 of the first clutch 110. The rotor 114 is already coupled to the sleeve 120. When the first clutch 110 is de-actuated, the armature 116 connects the sleeve 120 to the second clutch 118, thereby coupling the harmonic drive 104 to the second clutch 118. The second clutch 118 allows freewheeling of the harmonic drive 104 in a first direction. The second clutch 118 inhibits freewheeling in the opposite second direction.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A rotary actuator comprising:
   a motor; and
   a harmonic drive;
   the rotary actuator being configured to transition between an operating mode, a hold position mode, and an unpowered mode, the motor driving the harmonic drive when the rotary actuator is configured in the operating mode, the harmonic drive being held stationary when the rotary actuator is configured in the hold position mode, and the harmonic drive being allowed to freewheel independent of the motor in a first direction and being inhibited from freewheeling in an opposite second direction when the rotary actuator is configured in the unpowered mode;
   wherein the harmonic drive is allowed to turn in the second direction upon an application of a predetermined amount of torque that exceeds an expected aerodynamic load regardless of the operating mode into which the rotary actuator is configured.

2. A rotary actuator comprising:
   a motor;
   a harmonic drive;
   an electro-magnetic brake;
   a gear; and
   a motor pinion extending from the motor, through the electro-magnetic brake, to mesh with the gear;
   the rotary actuator being configured to transition between an operating mode, a hold position mode, and an unpowered mode, the motor driving the harmonic drive when the rotary actuator is configured in the operating mode, the harmonic drive being held stationary when the rotary actuator is configured in the hold position mode, and the harmonic drive being allowed to freewheel independent of the motor in a first direction and being inhibited from freewheeling in an opposite second direction when the rotary actuator is configured in the unpowered mode;
   wherein the electro-magnetic brake engages the motor pinion when the rotary actuator is configured in the hold position mode and in the unpowered mode; and
   wherein the electro-magnetic brake does not engage the motor pinion during the operating mode.

3. A rotary actuator comprising:
   a motor;
   a harmonic drive; and
   an electro-magnetic clutch operationally disposed between the motor and the harmonic drive, the electro-magnetic clutch including a stator, a rotor that is operationally coupled to the harmonic drive, and an armature that is operationally coupled to the motor, the electro-magnetic clutch being configured to transition between an engaged state and a disengaged state, the armature being engaged with the rotor to operationally couple the motor and the harmonic drive when the electro-magnetic clutch is configured in the engaged state, and the armature being disengaged from the rotor to decouple the harmonic drive from the motor when the electro-magnetic clutch is configured in the disengaged state;

the rotary actuator being configured to transition between an operating mode, a hold position mode, and an unpowered mode, the motor driving the harmonic drive when the rotary actuator is configured in the operating mode, the harmonic drive being held stationary when the rotary actuator is configured in the hold position mode, and the harmonic drive being allowed to freewheel independent of the motor in a first direction and being inhibited from freewheeling in an opposite second direction when the rotary actuator is configured in the unpowered mode.

4. The rotary actuator of claim 3, wherein the electro-magnetic clutch is configured in the engaged state when the rotary actuator is configured in the operating mode and the hold position mode.

5. The rotary actuator of claim 3, further comprising a one-way clutch selectively coupled to the rotor of the electro-magnetic clutch, wherein the one-way clutch is coupled to the rotor when the rotary actuator is configured in the unpowered mode.

6. The rotary actuator of claim 5, wherein the actuator couples the one-way clutch to the rotor when the electro-magnetic clutch is configured in the disengaged state; and wherein the rotor rotates independent of the one-way clutch when the electro-magnetic clutch is configured in the engaged state.

7. The rotary actuator of claim 3, further comprising a slip-clutch operationally disposed between the rotor of the electro-magnetic clutch and the harmonic drive so that torque is transferred from the rotor, through the slip-clutch, to the harmonic drive when the electro-magnetic clutch is configured in the engaged state, the slip-clutch enabling slipping of the harmonic drive relative to the rotor of the electro-magnetic clutch when the predetermined amount of torque is applied to the harmonic drive.

8. A rotary actuator assembly comprising:
a motor;
an electro-magnetic brake;
a gear;
a motor pinion extending from the motor, through the electro-magnetic brake, to mesh with the gear;
a one-way clutch aligned with the gear;
an electro-magnetic clutch aligned with the gear, the electro-magnetic clutch including a stator, a rotor, and an armature, the electro-magnetic clutch being configured to transition between an engaged state and a disengaged state, the armature being configured to transfer torque between the gear and the rotor when the electro-magnetic clutch is configured in the engaged state, and the armature being configured to transfer torque to the one-way clutch when the electro-magnetic clutch is configured in the disengaged state;
a harmonic drive; and
a mechanical slip-clutch operationally disposed between the electro-magnetic clutch and the harmonic drive so that torque is transferred from the rotor of the electro-magnetic clutch, through the slip-clutch, to the harmonic drive when the electro-magnetic clutch is engaged, the mechanical slip-clutch enabling slipping of the harmonic drive relative to the rotor of the electro-magnetic clutch when a predetermined amount of torque is applied to the harmonic drive from outside of the rotary actuator assembly.

9. The rotary actuator assembly of claim 8, wherein the electro-magnetic brake is configured to transition between a powered state and an unpowered state, the electro-magnetic brake allowing rotation of the motor pinion when in the powered state, and the electro-magnetic brake inhibiting rotation of the motor pinion when in the unpowered state, the electro-magnetic brake being in the powered state when the motor is powered, the electro-magnetic brake being in the unpowered state when the motor is unpowered.

10. The rotary actuator assembly of claim 8, further comprising:
a friction member disposed at the one-way clutch;
a sleeve rotationally fixed to the rotor of the electro-magnetic clutch, the sleeve having a portion disposed between the friction member and the armature of the electro-magnetic clutch so that, when the electro-magnetic clutch is configured in the disengaged state, the armature presses the sleeve against the friction member to rotationally fix the sleeve to the one-way clutch, thereby rotationally fixing the rotor of the electro-magnetic clutch to the one-way clutch.

11. The rotary actuator assembly of claim 10, wherein the friction member is a skewed roller plate.

12. The rotary actuator assembly of claim 8, wherein the one-way clutch is a sprag clutch.

13. The rotary actuator assembly of claim 8, wherein the gear is a spur gear.

14. The rotary actuator assembly of claim 8, wherein the rotary actuator assembly is installed in an aircraft, wherein the motor and the electro-magnetic brake are electrically coupled to a main power circuit of the aircraft; and wherein the electro-magnetic clutch is electrically coupled to a back-up battery.

15. The rotary actuator assembly of claim 8, wherein the slip-clutch includes:
a clutch body rotationally fixed to the rotor of the of the electro-magnetic clutch;
at least one friction member disposed between the clutch body and the harmonic drive; and
a biasing element configured to apply the predetermined amount of torque against the friction member so that the harmonic drive and the clutch body rotate together as a unit until the predetermined amount of torque is applied to the harmonic drive while the clutch body is held stationary.

16. The rotary actuator assembly of claim 15, wherein the at least one friction member includes a skewed roller plate.

17. The rotary actuator assembly of claim 8, wherein the motor pinion is configured to rotate about a first axis; and wherein the gear, rotor, and harmonic drive are configured to rotate about a second axis that is parallel to the first axis.

18. A method of operating a rotary actuator including a motor configured to rotate a motor pinion, the rotary actuator also including a gear turned by the motor pinion, the method comprising:
configuring an electro-magnetic brake in a powered state to release the motor pinion;
operating the motor to rotate the motor pinion relative to the electro-magnetic brake to rotate the gear to a desired position, wherein operating the motor to rotate the motor pinion comprises transferring torque from the motor, through the motor pinion, through the gear, through an electro-magnetic clutch, through a slip-clutch, to a harmonic drive output; and configuring the electro-magnetic brake in an unpowered state to engage the motor pinion, thereby inhibiting rotation of the motor pinion, when the gear reaches the desired position.

19. The method of claim 18, further comprising:

upon losing main power, configuring the electro-magnetic brake in the unpowered state regardless of a position of the gear;

decoupling a rotor of the electro-magnetic clutch from the gear;

coupling the rotor to a one-way clutch to enable movement in a first direction and inhibit movement in the second direction absent a predetermined load applied to the harmonic drive output.

* * * * *